United States Patent
Lee (10) Patent No.: US 8,941,985 B2
(45) Date of Patent: Jan. 27, 2015

(54) EXPANDABLE KEYBOARD DEVICE

(71) Applicant: Tung-Yang Lee, New Taipei (TW)

(72) Inventor: Tung-Yang Lee, New Taipei (TW)

(73) Assignee: Wistron Corporation, New Taipei (TW)

( * ) Notice: Subject to any disclaimer, the term of this patent is extended or adjusted under 35 U.S.C. 154(b) by 179 days.

(21) Appl. No.: 13/743,766

(22) Filed: Jan. 17, 2013

(65) Prior Publication Data

US 2013/0188304 A1    Jul. 25, 2013

(30) Foreign Application Priority Data

Jan. 19, 2012    (TW) .............................. 101102195 A (51) Int. Cl.
*G06F 1/16*    (2006.01)
(52) U.S. Cl.
CPC ............ *G06F 1/1667* (2013.01); *G06F 1/1669* (2013.01)
USPC ................ 361/679.41; 312/223.1; 312/223.2; 710/303; 710/304
(58) Field of Classification Search
CPC .... G06F 1/1626; G06F 1/1632; G06F 1/1669
USPC ........................... 361/679.11, 679.12, 679.41
See application file for complete search history.

(56) References Cited

U.S. PATENT DOCUMENTS

| | | | | |
|---|---|---|---|---|
| 5,826,840 | A * | 10/1998 | Yun ................................ | 248/118 |
| 6,724,614 | B1 * | 4/2004 | Chiang et al. ............ | 361/679.44 |
| 6,882,524 | B2 * | 4/2005 | Ulla et al. ................ | 361/679.09 |
| 6,937,468 | B2 | 8/2005 | Lin et al. | |
| 6,980,420 | B2 * | 12/2005 | Maskatia et al. .......... | 361/679.57 |
| 6,989,987 | B1 * | 1/2006 | Wilson et al. ............. | 361/679.02 |
| 7,298,610 | B2 * | 11/2007 | Kim et al. ................ | 361/679.55 |
| 7,599,178 | B2 * | 10/2009 | Huang et al. .............. | 361/679.43 |
| 7,679,902 | B2 * | 3/2010 | Thompson ............... | 361/679.44 |
| 8,208,245 | B2 * | 6/2012 | Staats et al. .............. | 361/679.02 |
| 8,638,552 | B1 * | 1/2014 | Tuero ........................ | 361/679.41 |
| 2003/0025674 | A1 * | 2/2003 | Watanabe ...................... | 345/168 |
| 2011/0292584 | A1 * | 12/2011 | Hung et al. .............. | 361/679.26 |
| 2012/0066424 | A1 * | 3/2012 | Gentil ........................... | 710/303 |
| 2012/0327594 | A1 * | 12/2012 | Gengler ................... | 361/679.56 |
| 2013/0039000 | A1 * | 2/2013 | Vicente et al. ........... | 361/679.41 |
| 2013/0155583 | A1 * | 6/2013 | Yang et al. ............... | 361/679.01 |

FOREIGN PATENT DOCUMENTS

TW    M243698    9/2004
TW    M349349    1/2009

OTHER PUBLICATIONS

Office Action dated Aug. 21, 2014 for Taiwanese Application No. 101102195.

* cited by examiner

*Primary Examiner* — Anthony Q Edwards
(74) *Attorney, Agent, or Firm* — The Mueller Law Office, P.C.

(57) ABSTRACT

An expandable keyboard device for use in connection with an electronic device includes a keyboard module having a keyboard housing, a pivot unit connected to the keyboard housing, and a clamping mechanism including a mounting seat connected to the pivot unit and rotatable relative to the keyboard module, and at least one clamping arm cooperating with the mounting seat to define a receiving slot for receiving the electronic device. The clamping arm is movable relative to the mounting seat for clamping the electronic device.

15 Claims, 9 Drawing Sheets

EXPANDABLE KEYBOARD DEVICE

CROSS REFERENCE TO RELATED APPLICATION

This application claims priority of Taiwanese Patent Application No. 101102195, filed on Jan. 19, 2012, the disclosure of which is incorporated herein by reference.

BACKGROUND OF THE INVENTION

1. Field of the Invention

The invention relates to an expandable keyboard device, more particularly to an expandable keyboard device that can be used as an external keyboard of an electronic device.

2. Description of the Related Art

In recent years, due to the development of touch technology, tablet computers have gradually become popular electronic products. Although tablet computers are easy to carry, when they are placed on a desk top for use, there is lacking a support structure to keep them upright. Thus, they can only be laid flat on the desk top. This causes inconvenience for a user to view the screen.

To resolve the aforementioned problem, expandable keyboard devices are developed, apart from supporting the tablet computers upright to facilitate viewing of the screen by a user, can also facilitate the user to input messages. However, the expandable keyboard devices produced by manufacturers are suitable for use on their own tablet computers. That is, the structure for clamping and positioning the tablet computer on the expandable keyboard device is compatible only with their own product. Hence, when the user uses a tablet computer made by other manufacturer, he/she has no choice but to buy the corresponding expandable keyboard device made by said manufacturer so as to be compatible with his/her tablet computer.

An expandable keyboard device, as disclosed in U.S. Pat. No. 6,937,468, provides positioning of an electronic device, such as a tablet computer, by insertion. Apart from being used as an external keyboard of the tablet computer, it can also support the electronic device in an upright state to facilitate viewing by the user. However, the base structure for positioning of the electronic device thereto is fixed, and is not suitable for use with an electronic device having a certain thickness.

SUMMARY OF THE INVENTION

Therefore, an object of the present invention is to provide an expandable keyboard device that can position an electronic device through a clamping method and that can provide good clamping effect for different thicknesses of electronic devices.

According to one aspect of this invention, an expandable keyboard device for use in connection with an electronic device comprises a keyboard module including a keyboard housing and a plurality of keys disposed on the keyboard housing, a pivot unit connected to the keyboard housing, and a clamping mechanism including a mounting seat connected to the pivot unit and rotatable relative to the keyboard module, and at least one clamping arm cooperating with the mounting seat to define a receiving slot for receiving the electronic device. The clamping arm is movable relative to the mounting seat for clamping the electronic device.

The clamping mechanism includes two clamping arms, and further includes a pair of clamping members having the clamping arms for clamping therebetween the electronic device, a first biasing member disposed between the clamping members to bias the clamping members away from each other, a restricting mechanism disposed in the mounting seat to restrict movement of the clamping members away from each other, and a releasing member to release the restriction imposed on the clamping members by the restricting mechanism.

Each of the clamping members further has a base plate connected between the clamping arms, and a toothed structure formed on the base plate. The restricting mechanism includes a first gear unit and a second gear unit meshing with each other, a restricting member disposed movably between the first gear unit and the releasing member, and a second biasing member. The first gear unit further meshes with the toothed structure of one of the clamping members. The second gear unit further meshes with the toothed structure of the other one of the clamping members. The restricting member has a first arm section interfering with the first gear unit, and a second arm section abutting against the releasing member. The second biasing member biases the first arm section to interfere with the first gear unit. The releasing member is pressed to actuate the first arm section away from the first gear unit.

The clamping mechanism includes two clamping arms that are spaced apart from each other and that cooperate with the mounting seat to define the receiving slot. The clamping arms are moved away from each other for permitting the electronic device to be received in the receiving slot.

The clamping arms extend gradually upward toward each other.

The mounting seat is connected integrally as one piece with the clamping arms. The clamping arms extend gradually upward toward each other.

The clamping mechanism includes two clamping arms, and further includes a pair of clamping members respectively having the clamping arms, and a first biasing member disposed between the clamping members to bias the clamping members toward each other for clamping the electronic device therebetween.

The mounting seat has a top face with a concavely curved shape.

The clamping mechanism further includes a connector disposed on the mounting seat for electrical connection with the electronic device.

The clamping arm includes a rigid outer layer and a compressible resilient inner layer connected to the rigid outer layer.

The efficiency of this invention resides in that through the disposition of the clamping mechanism, the electronic device can be connected to the expandable keyboard device by a clamping method. Further, because the clamping arm is movable, the width of the receiving slot can be varied to fit electronic devices with different thicknesses, so that a good clamping effect can be achieved. Moreover, through connection of the clamping mechanism with the pivot unit, when the electronic device is clamped and positioned, an inclined angle thereof relative to the keyboard module 1 can be simultaneously adjusted. Hence, convenience in use can be enhanced.

BRIEF DESCRIPTION OF THE DRAWINGS

Other features and advantages of the present invention will become apparent in the following detailed description of the embodiments with reference to the accompanying drawings, of which.

DETAILED DESCRIPTION OF THE EMBODIMENTS

The above-mentioned and other technical contents, features, and effects of this invention will be clearly presented from the following detailed description of three embodiments in coordination with the reference drawings.

Before this invention is described in detail, it should be noted that, in the following description, similar elements are designated by the same reference numerals.

Figure 1:
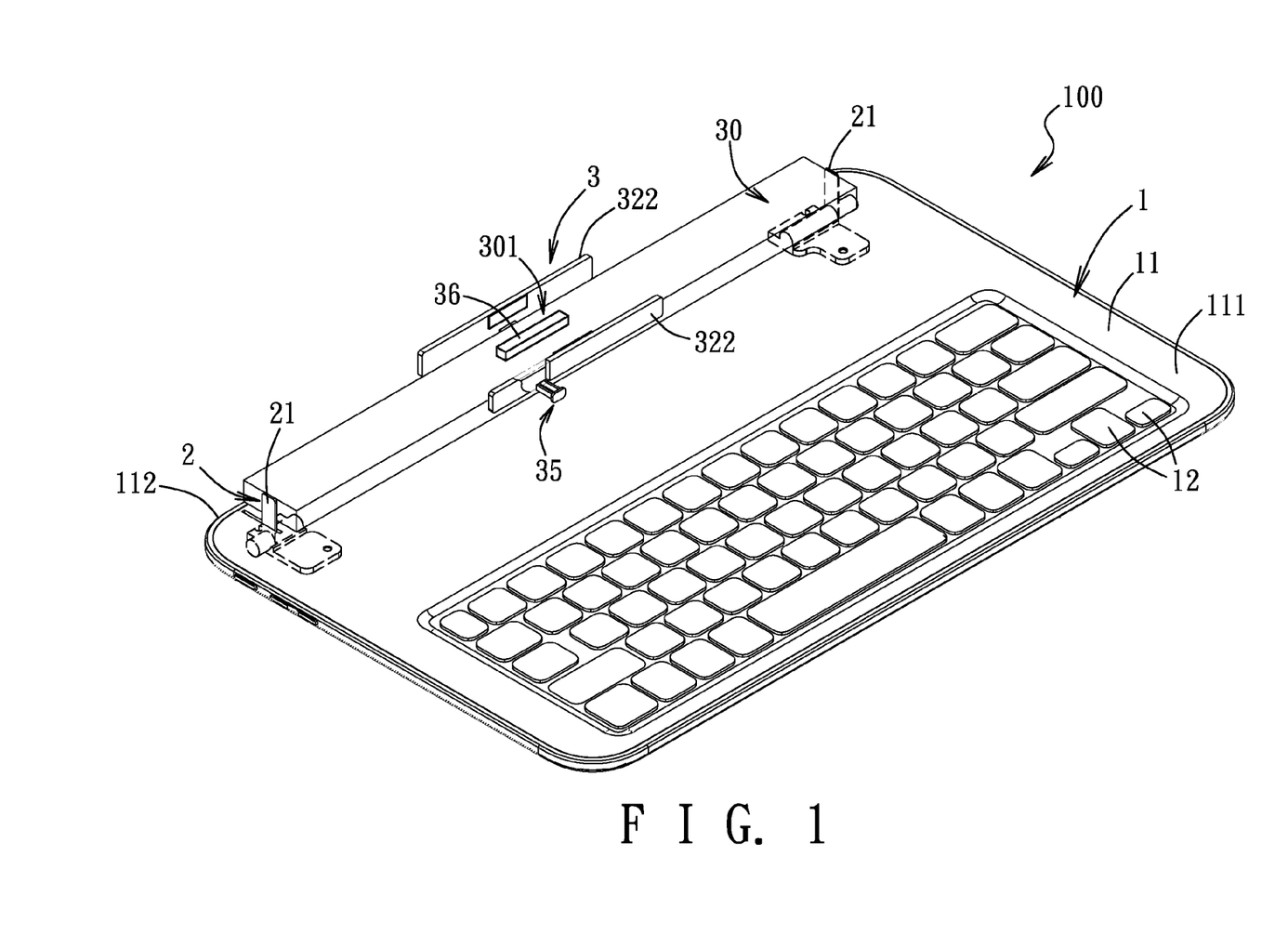
FIG. 1 is a perspective view of an expandable keyboard device according to the first embodiment of the present invention.
Figure 2:
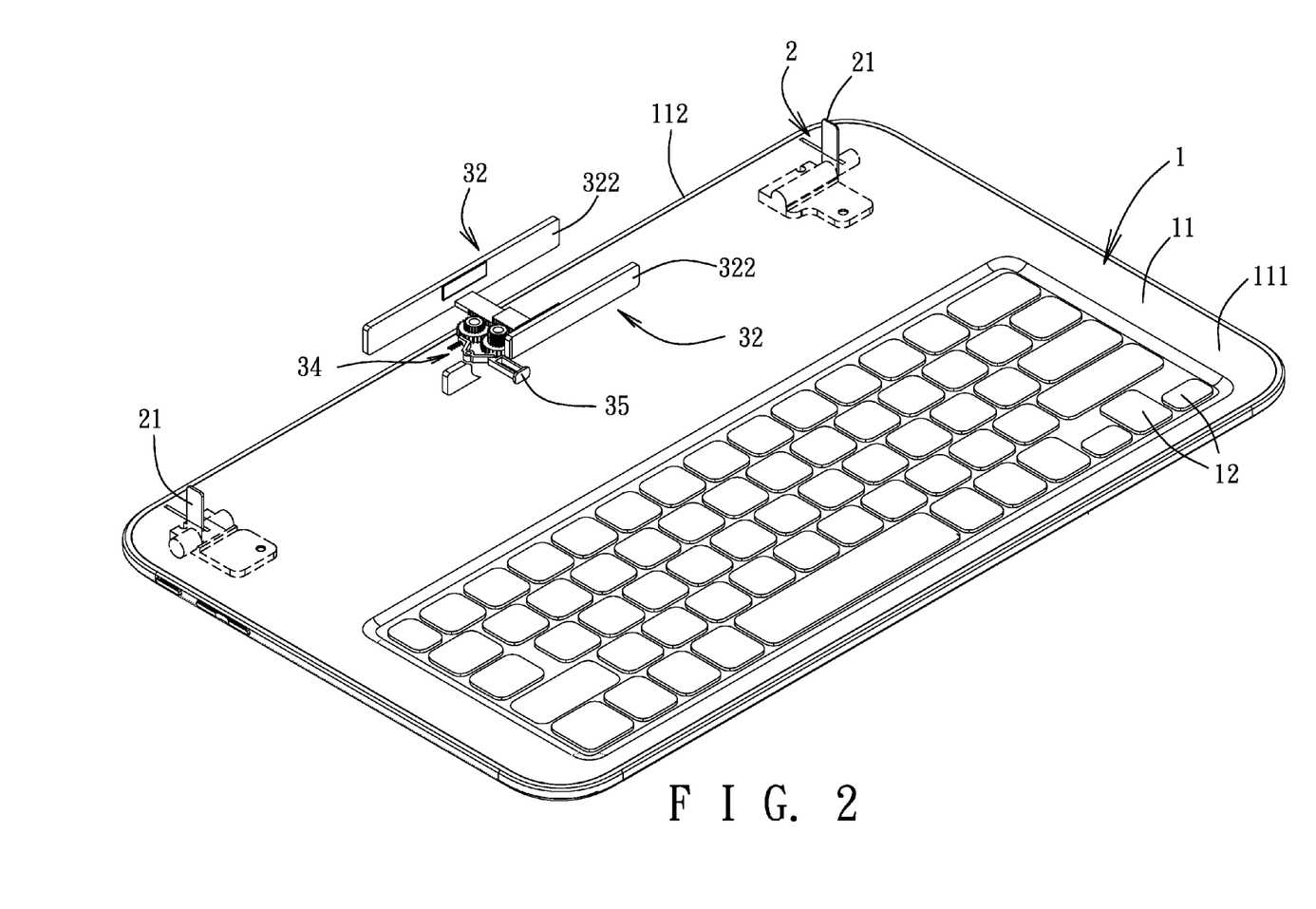
FIG. 2 is a view similar to FIG. 1, but with a mounting seat removed for clarity's sake.

Referring to FIGS. 1 and 2, an expandable keyboard device 100 according to the first embodiment of the present invention is shown to comprise a keyboard module 1, a pivot unit 2 and a clamping mechanism 3. The keyboard module 1 includes a keyboard housing 11 and a plurality of keys 12. The keyboard housing 11 has a top surface 111 and a rear edge 112. The keys 12 are disposed on the keyboard housing 11 and are exposed from the top surface 111 thereof. The pivot unit 2 is connected to the keyboard housing 11 in proximity to the rear edge 112 thereof. In this embodiment, the pivot unit 2 employs a pair of hinge mechanisms 21 that are connected to the keyboard housing 11 and that are spaced apart from each other in a left-right direction.

Referring to FIGS. 1 to 4, the clamping mechanism 3 includes a mounting seat 30, a pair of clamping members 32, a first biasing member 33, a restricting mechanism 34 and a releasing member 35. The mounting seat 30 has an elongated hollow structure with two opposite ends connected respectively to the two hinge mechanisms 21, so that the mounting seat 30 can rotate forward and backward relative to the keyboard housing 11 through the pivot unit 2. The first biasing member 33, the restricting mechanism 34 and the releasing member 35 are disposed within the mounting seat 30. Each of the clamping members 32 includes a base plate 321, a clamping arm 322 extending upwardly from the base plate 321, and a toothed structure 324 formed on a lateral edge 323 of the base plate 321. The base plate 321 has a protruding block 325 protruding downwardly therefrom. The clamping members 32 have the base plates 321 extending into the mounting seat 30, and the clamping arms 322 extending externally of the mounting seat 30 and spaced apart from each other in a front-rear direction.

Figure 4:
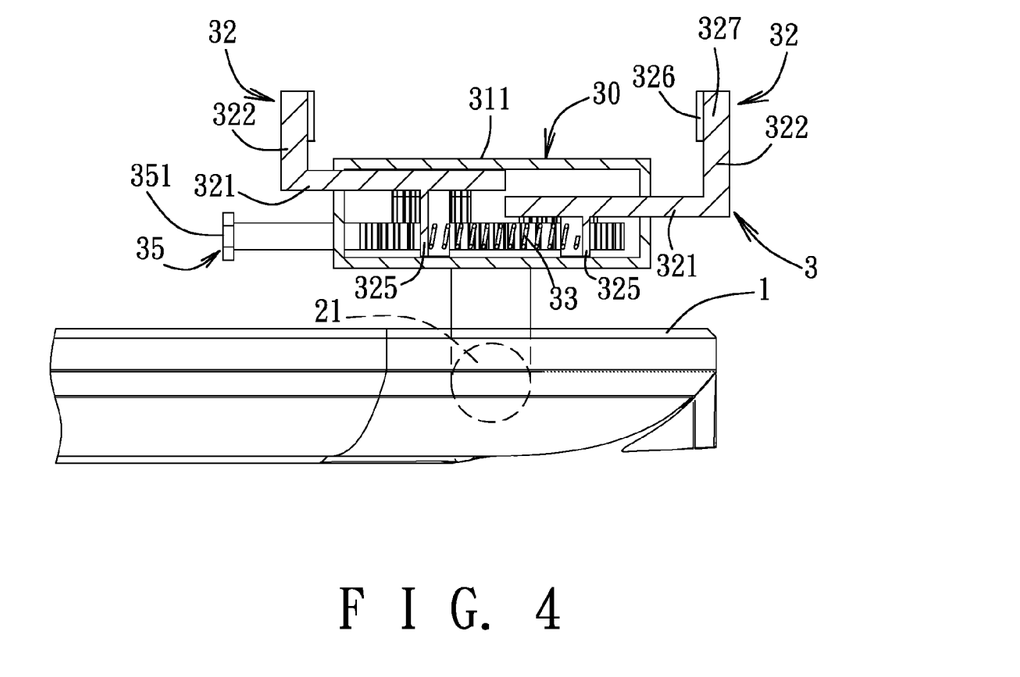
FIG. 4 is a sectional view of the clamping mechanism of the first embodiment.
Figure 6:
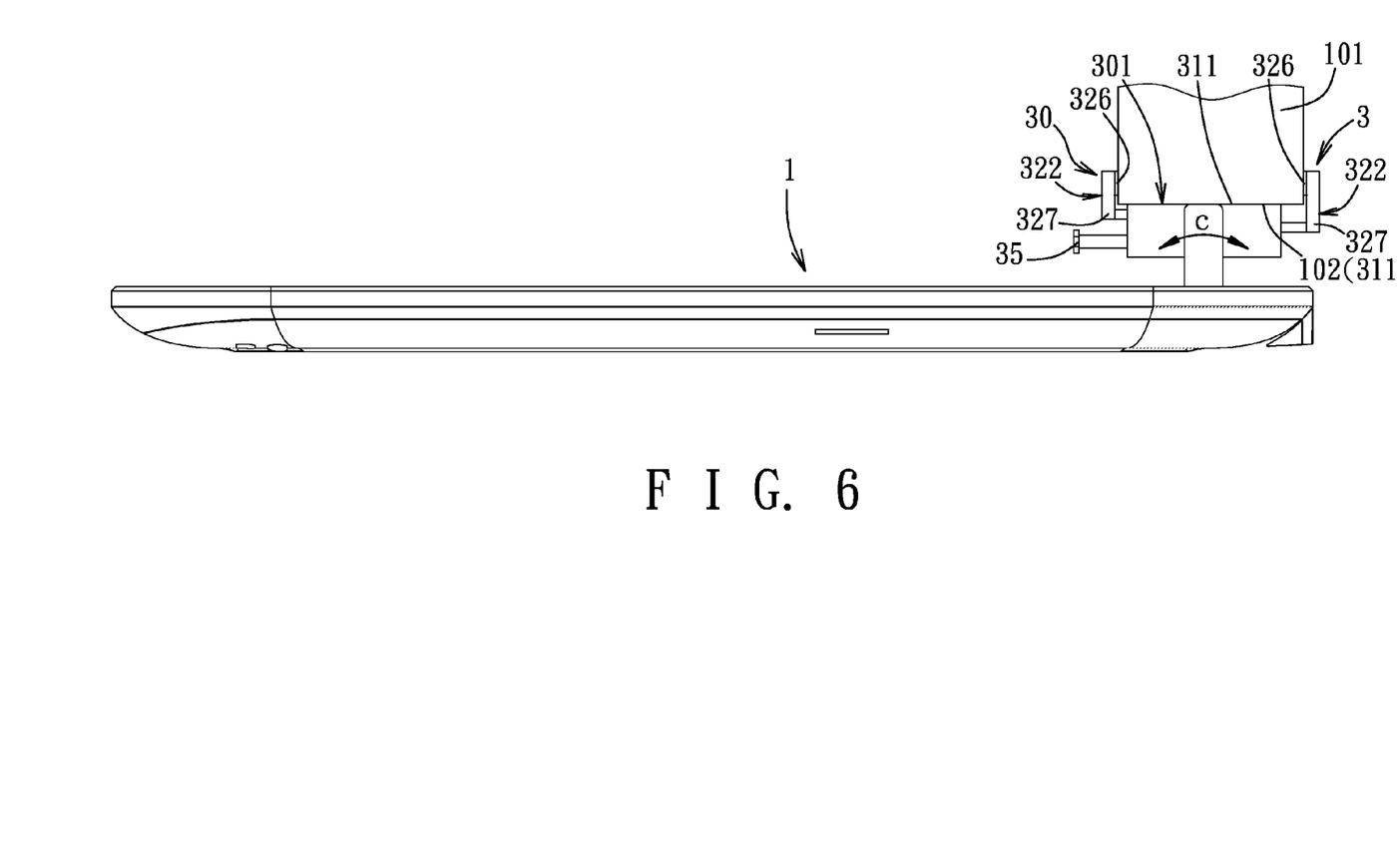
FIG. 6 is a schematic side view of the first embodiment, illustrating how an electronic device is clamped by the clamping mechanism.
Figure 7:
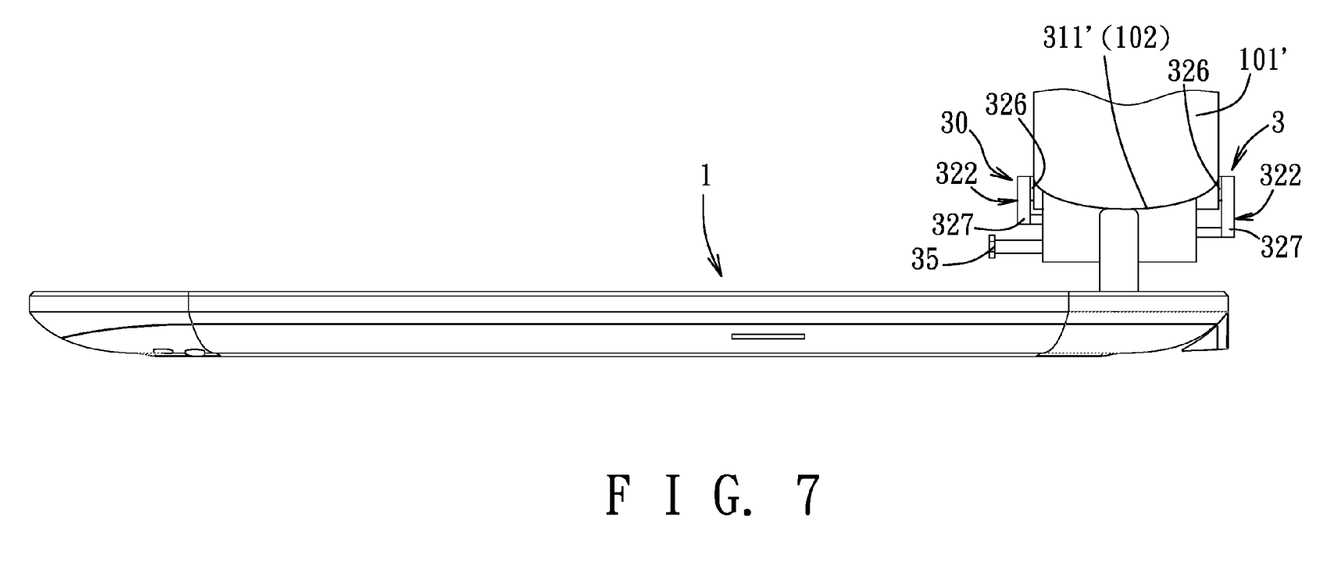
FIG. 7 is a view similar to FIG. 6, but illustrating the mounting seat having a concavely curved top surface.

As shown in FIGS. 4 and 6, the clamping arms 322 and a top face 311 of the mounting seat 30 cooperatively define a receiving slot 301 for receiving a lateral end 102 of an electronic device 101. The lateral end 102 refers to a lateral end at a bottom portion of the electronic device 101. It is worth to mention that, although the top face 311 of the mounting seat 30 is flat in this embodiment, the top face 311' of the mounting seat 30 may be concavely curved, as shown in FIG. 7, so as to match the shape of a curved lateral end 102' of an electronic device 101', thereby stably supporting the lateral end 102' of the electronic device 101'. Referring again to FIG. 4, with regard to the specific structures of the mounting seat 30 and the clamping members 32 of this invention, they may be varied according to actual requirements, and this figure is presented for the purpose of illustration only. In this embodiment, the first biasing member 33 is a compression spring that is disposed between the protruding blocks 325 of the clamping members 32 to bias the clamping members 32 away from each other.

Figure 3:
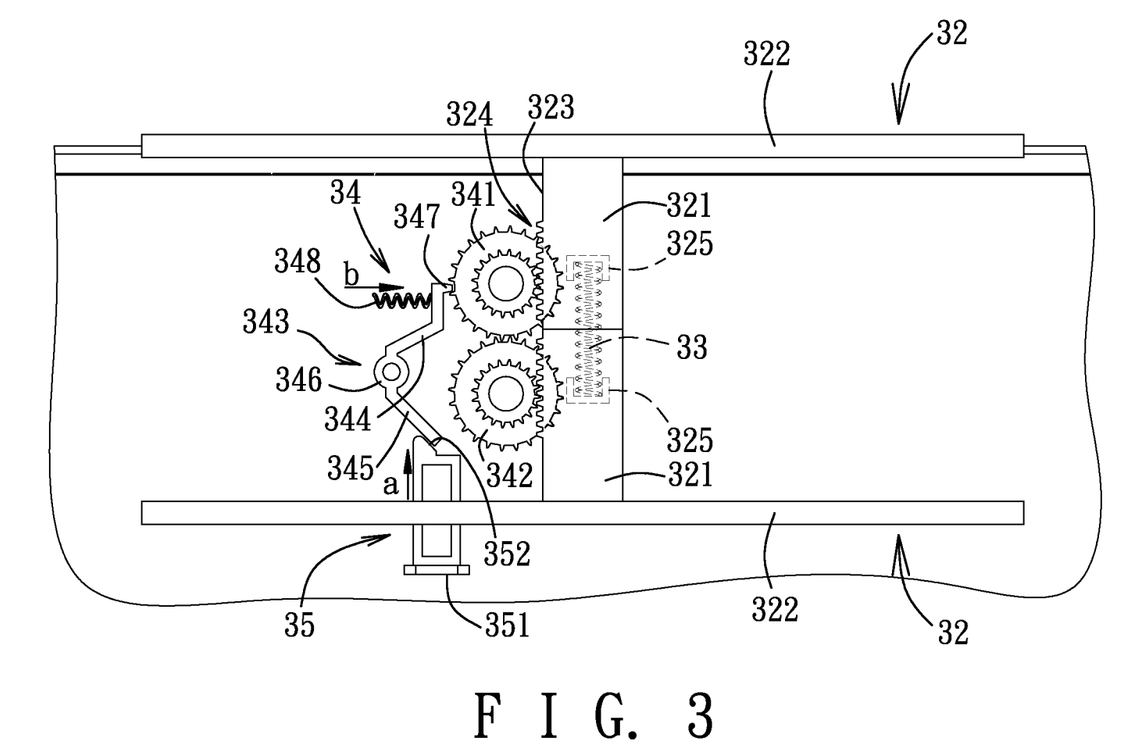
FIG. 3 is a fragmentary schematic top view of a clamping mechanism of the first embodiment without the mounting seat.

With reference to FIGS. 2 to 4, the restricting mechanism 34 is disposed between the clamping members 32. In this embodiment, the restricting mechanism 34 includes a first gear unit 341, a second gear unit 342, a restricting member 343 and a second biasing member 348. The first gear unit 341 is meshed with the toothed structure 324 of one of the clamping members 32. The second gear unit 342 is meshed with the toothed structure 324 of the other one of the clamping members 32. Further, the first and second gear units 341, 342 also mesh with each other. The restricting member 343 generally has a strip structure, and includes a first arm section 344, a second arm section 345 and a connecting section 346 interconnecting the first and second arm sections 344, 345. The restricting member 343 is rotatably disposed on the mounting seat 30 through the connecting section 346 thereof, and is located between the first gear unit 341 and the releasing member 35. The first arm section 344 is proximate to the first gear unit 341, and has a projecting tooth 347 meshed releasably with the first gear unit 341. The second biasing member 348 is a compression spring that is disposed between the mounting seat 30 and the first arm section 344 and that biases the first arm section 344 toward the first gear unit 341 so as to mesh the projecting tooth 347 with the first gear unit 341, thereby forming an interference with the first gear unit 341. The second arm section 345 is proximate to the releasing member 35.

The releasing member 35 of this embodiment includes an exposed end 351 and an abutment end 352. The exposed end 351 is exposed from the mounting seat 30 so as to be depressed. The abutment end 352 is disposed within the mounting seat 30 and abuts against the second arm section 345 of the restricting member 343. In this embodiment, the exposed end 351 extends forwardly and outwardly from the mounting seat 30 so that the releasing member 35 can be depressed to move rearwardly relative to the mounting seat 30. Through the abutment end 352 that pushes the second arm section 345, the entire restricting member 343 is moved rotatably. The second arm section 345 is pushed by the releasing member 35 to displace along a direction (a) (see FIG. 3). The first arm section 344 is biased by the second biasing member 348 to displace along a direction (b) (see FIG. 3) which is perpendicular to the direction (a) so as to mesh with the first gear unit 341. The releasing member 35 actuates the first arm section 344 to move away from and release the interference with the first gear unit 341.

Figure 5:
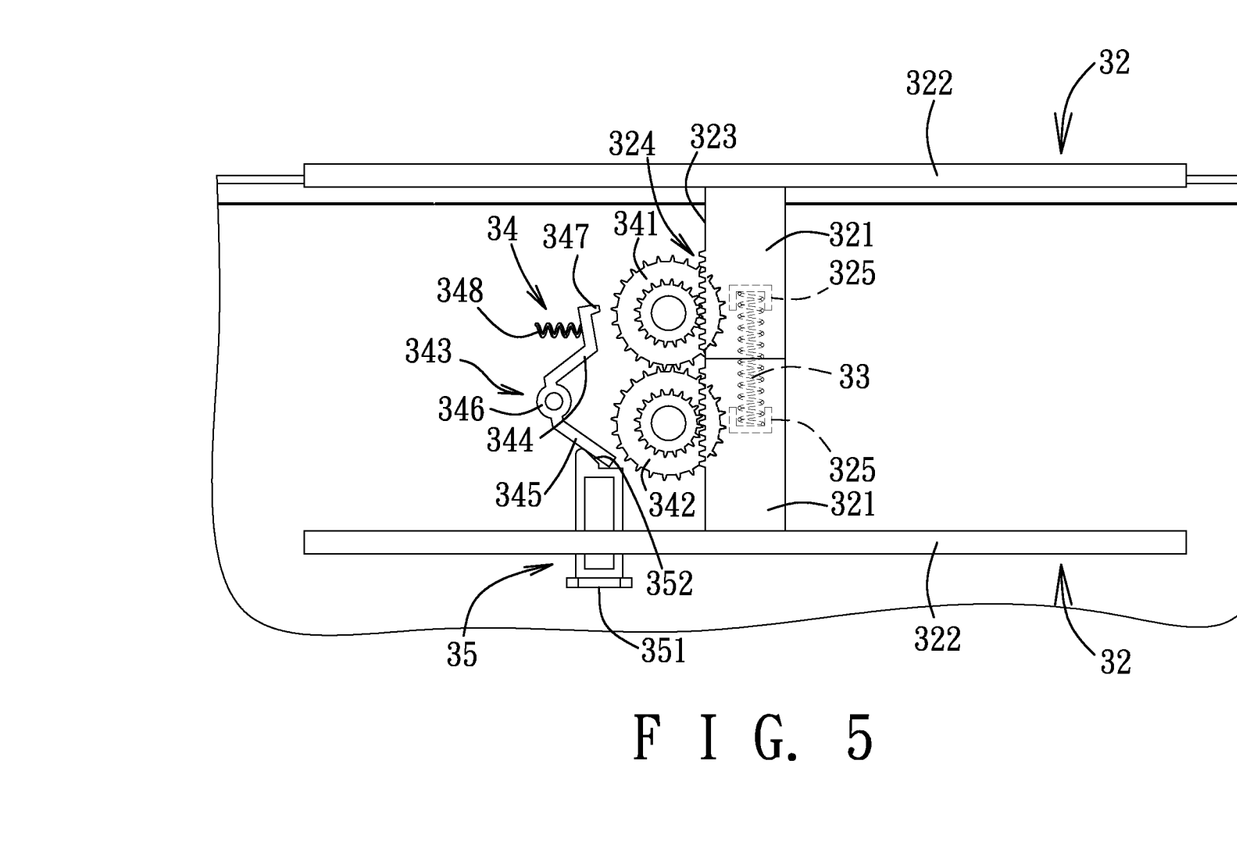
FIG. 5 is a view similar to FIG. 3, but illustrating a restricting member being pushed by a releasing member to disengage from a first gear unit.

Referring to FIGS. 5 and 6, when it is desired to use the clamping mechanism 3 to clamp the electronic device 101, the releasing member 35 is first depressed to release interference between the restricting member 343 and the first gear unit 341. Because the first biasing member 33 is a compression spring, the clamping members 32 are biased to move away from each other to a maximum distance. Next, the electronic device 101 is placed in the receiving slot 301 so as to be supported by the mounting seat 30 and be disposed between the clamping arms 322 of the clamping members 32. The clamping arms 322 are then pushed toward each other until they abut respectively against front and rear surfaces of the electronic device 101. Afterwards, the depressed releasing member 35 is released, so that the first arm section 344 of the restricting member 343, through a returning force of the second biasing member 348, is moved to its original position, as shown in FIG. 3, and forms an interference with the first gear unit 341 again to thereby stop the first gear unit 341 from rotation. As such, the clamping members 32 are limited to abut against the respective front and rear surfaces of the electronic device 101. Hence, the electronic device 101 is clamped and positioned between the clamping arms 322. Electrical connection between the electronic device 101 and the keyboard module 1 can be achieved through, for example, various sorts of wired or wireless transmission. For example, in this embodiment, the clamping mechanism 3 further includes a connector 36 (see FIG. 1) disposed on the mounting seat 30 for forming an electrical connection with a connector of the electronic device 101.

On the other hand, because the clamping mechanism 3 is connected to the pivot unit 2, the electronic device 101 in the clamping state can rotate relative to the keyboard module 1 through the pivot unit 2 in the direction of double arrow (c) shown in FIG. 6. As such, an inclined angle of the electronic device 101 relative to the keyboard module 1 can be adjusted.

With reference to FIGS. 4 to 6, moreover, because the distance between the clamping arms 322 (i.e., the clamping force exerted on the electronic device 101) is determined through engagement of the tooth 347 of the first arm section 344 with the first gear unit 341, to achieve a better clamping effect upon the electronic device 101 by the clamping arms 322, in this embodiment, each clamping arm 322 includes a rigid outer layer 327 and a compressible resilient inner layer 326 connected to an inner side of the outer layer 327. The material of the resilient inner layer 326 may be, for example, foam, rubber, etc. The resilient inner layer 326 is used to contact the electronic device 101. When the electronic device 101 is clamped between the clamping arms 322, because the tooth 347 of the first arm section 344 engages the first gear unit 341 under the state that the resilient inner layers 326 of the clamping arms 322 are compressed to contact the respective front and rear surfaces of the electronic device 101, the amount of compression of the resilient inner layers 326 can be used to absorb gaps between the electronic device 101 and the clamping arms 322 caused by the tooth gaps of the first gear unit 341. In this manner, the clamping arms 322 can maintain a good clamping effect on the electronic device 101. Further, by using the resilient inner layers 326 to contact the electronic device 101, the surfaces of the electronic device 101 can be effectively guarded against scratching.

It is worth to mention that, in this embodiment, because the first gear unit 341 and the second gear unit 342 mesh with each other, the clamping members 32 can move simultaneously when bias by the first biasing member 33, so that the clamping members 32 are both movable. However, in an alternative embodiment, the second gear unit 342 maybe dispensed herewith and the clamping member 32 that cooperates therewith may be fixed, so that only the clamping member 32 that cooperates with the first gear unit 341 is movable to provide adjustment. The clamping arms 322 can similarly abut against the respective front and rear surfaces of the electronic device 101 to effect clamping of the electronic device 101 therebetween. In the case that only one of the clamping members 32 is movable, the movable clamping member 32 may be the front or rear one.

Furthermore, in this embodiment, the restricting mechanism 34 uses the gear units 341, 342 to mesh with the toothed structures 324, but it is not limited as such. As long as an interference can be produced by at least one of the clamping members 32 to limit the movement of the clamping members 32 toward or away from each other, and the releasing member 35 is used to release the interference, various structural designs may be acceptable.

Figure 8:
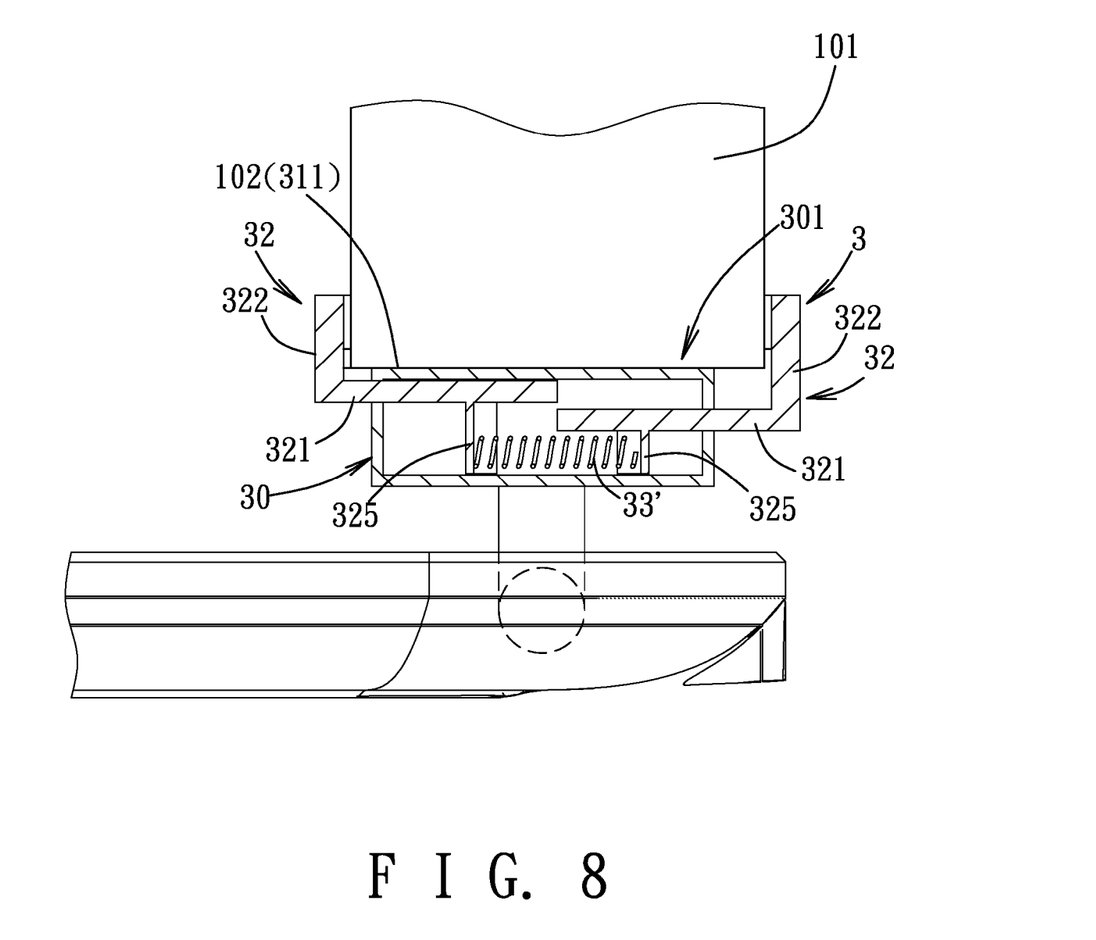
FIG. 8 is a fragmentary sectional view of an expandable keyboard device according to the second embodiment of the present invention.

Referring to FIG. 8, the second embodiment of this invention is shown to be similar to the first embodiment. However, in this embodiment, the restricting mechanism 34, the releasing member 35 and the second biasing member 348 of the clamping mechanism 3 shown in FIG. 3 are all dispensed herewith. As shown in FIG. 8, the first biasing member 33' is a tension spring connected between the protruding blocks 325 of the base plates 321 of the clamping members 32. The first biasing member 33' biases the clamping members 32 toward each other. To clamp the electronic device 101 by the clamping mechanism 3, the clamping arms 322 are simply pulled away from each other at a distance larger than the thickness of the electronic device 101, after which the electronic device 101 is inserted into the receiving slot 301. Through the biasing force of the first biasing member 33', the clamping arms 322 of the clamping members 32 are forced to abut against the respective front and rear surfaces of the electronic device 101, thereby effectively clamping the electronic device 101 therebetween.

Figure 9:
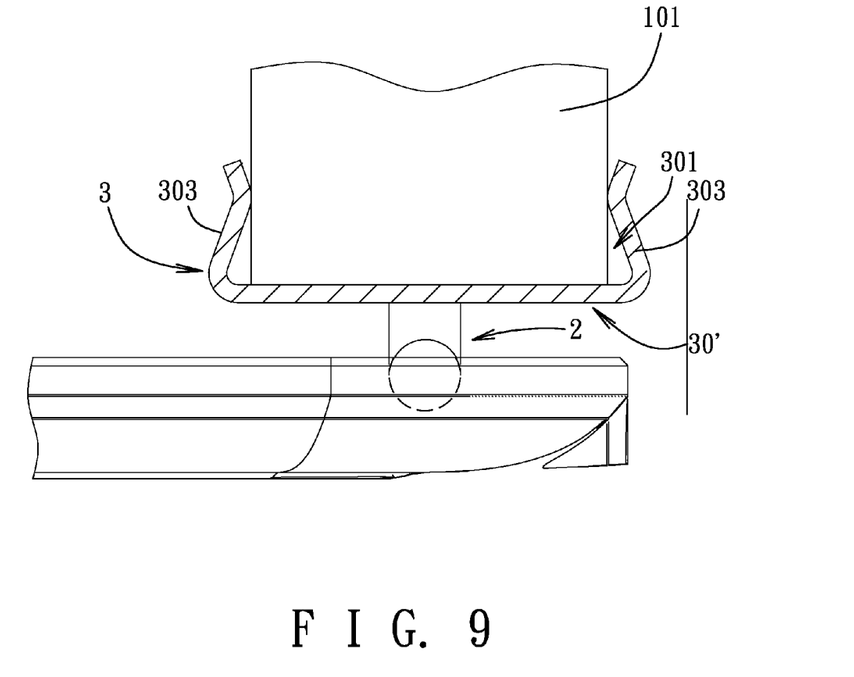
FIG. 9 is a fragmentary sectional view of an expandable keyboard device according to the third embodiment of the present invention.

Referring to FIG. 9, the third embodiment of this invention is shown to be similar to the first embodiment. However, in this embodiment, apart from dispensing the restricting mechanism 34, the releasing member 35 and the second biasing member 348 of the clamping mechanism 3 shown in FIG. 3, the structure of the mounting seat 30' is varied. In this embodiment, the mounting seat 30' is connected integrally as one piece with the clamping arms 303 to form a dovetail structure. A one-piece plate may be bent to form the dovetail structure. The clamping arms extend gradually upward toward each other and then away from each other so that top ends thereof are distal from each other.

To clamp the electronic device 101 by the clamping mechanism 3, the clamping arms 303 are pulled away from each other to store a restoring force. After the electronic device 101 is inserted into the receiving slot 301 between the clamping arms 303, through the restoring force of the clamping arms 303, the clamping arms 303 are moved toward each other to clamp therebetween the electronic device 101.

In sum, through the disposition of the clamping mechanism 3, the electronic device 101 can be connected to the expandable keyboard device 100 by a clamping method. Further, because at least one of the clamping arms 322, 303 is movable, the width of the receiving slot 301 can be varied to fit electronic devices 101 with different thicknesses, so that a good clamping effect can be achieved. Therefore, the object of this invention can be realized. Moreover, for a user having a different model and size of electronic device 101, there is no need to buy expandable keyboard devices having different specifications. This can save the cost significantly. In addition, through connection of the clamping mechanism 3 with the pivot unit 2, when the electronic device 101 is clamped and positioned, an inclined angle thereof relative to the keyboard module 1 can be simultaneously adjusted. Hence, convenience in use can be enhanced.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An expandable keyboard device for use in connection with an electronic device, said expandable keyboard device comprising:
  a keyboard module including a keyboard housing that has a rear edge and a front edge opposite to said rear edge, and a set of keys disposed on said keyboard housing and proximate to said front edge;
  a pivot unit connected to said keyboard housing and proximate to said rear edge; and
  a clamping mechanism including a mounting seat connected to said pivot unit and rotatable relative to said keyboard module, and two clamping arms, one of said clamping arms being disposed on said keyboard housing in proximity to said rear edge, the other one of said clamping arms being disposed between said one of said clamping arms and said set of keys, said mounting seat being disposed between and cooperating with said clamping arms to define a receiving slot for clampingly receiving the electronic device, said clamping arms being movable toward or away from each other to adjust a distance between said clamping arms for respectively abutting against front and rear surfaces of the electronic device.

2. An expandable keyboard device for use in connection with an electronic device, said expandable keyboard device comprising:
  a keyboard module including a keyboard housing and a plurality of keys disposed on said keyboard housing;
  a pivot unit connected to said keyboard housing; and
  a clamping mechanism including a mounting seat connected to said pivot unit and rotatable relative to said keyboard module, said clamping mechanism comprising a pair of clamping members, each of which has a clamping arm, a first biasing member disposed between said clamping members to bias said clamping members away from each other, a restricting mechanism disposed in said mounting seat to restrict movement of said clamping members away from each other, and a releasing member to release the restriction imposed on said clamping members by said restricting mechanism, said clamping arms of said clamping members cooperating with said mounting seat to define a receiving slot for receiving the electronic device, and being movable relative to said mounting seat for clamping therebetween the electronic device.

3. The expandable keyboard device as claimed in claim 1, wherein said two clamping arms are spaced apart from each other and cooperate with said mounting seat to define said receiving slot, said clamping arms being moved away from each other for permitting the electronic device to be received in said receiving slot.

4. The expandable keyboard device as claimed in claim 3, wherein said clamping arms extend gradually upward toward each other.

5. The expandable keyboard device as claimed in claim 3, wherein said mounting seat is connected integrally as one piece with said clamping arms, said clamping arms extending gradually upward toward each other.

6. The expandable keyboard device as claimed in claim 3, wherein each of said clamping arms includes a rigid outer layer and a compressible resilient inner layer connected to said rigid outer layer.

7. The expandable keyboard device as claimed in claim 1, wherein said mounting seat has a top face with a concavely curved shape.

8. The expandable keyboard device as claimed in claim 1, wherein said clamping mechanism further includes a connector disposed on said mounting seat for electrical connection with the electronic device.

9. The expandable keyboard device as claimed in claim 1, wherein said clamping arm includes a rigid outer layer and a compressible resilient inner layer connected to said rigid outer layer.

10. The expandable keyboard device as claimed in claim 2, wherein each of said clamping members further has a base plate connected between said clamping arms, and a toothed structure formed on said base plate, said restricting mechanism including a first gear unit and a second gear unit meshing with each other, a restricting member disposed movably between said first gear unit and said releasing member, and a second biasing member, said first gear unit further meshing with said toothed structure of one of said clamping members, said second gear unit further meshing with said toothed structure of the other one of said clamping members, said restricting member having a first arm section interfering with said first gear unit, and a second arm section abutting against said releasing member, said second biasing member biasing said first arm section to interfere with said first gear unit, said releasing member being pressed to actuate said first arm section away from said first gear unit.

11. The expandable keyboard device as claimed in claim 2, wherein said mounting seat has a top face with a concavely curved shape.

12. The expandable keyboard device as claimed in claim 2, wherein said clamping mechanism further includes a connector disposed on said mounting seat for electrical connection with the electronic device.

13. An expandable keyboard device for use in connection with an electronic device, said expandable keyboard device comprising:
  a keyboard module including a keyboard housing and a plurality of keys disposed on said keyboard housing;
  a pivot unit connected to said keyboard housing; and
  a clamping mechanism including a mounting seat connected to said pivot unit and rotatable relative to said keyboard module, said clamping mechanism comprising a pair of clamping members respectively having a clamping arm, and a first biasing member disposed between said clamping members to bias said clamping members toward each other for clamping the electronic device therebetween, said clamping arms of said clamping members cooperating with said mounting seat to define a receiving slot for receiving the electronic device, and being movable relative to said mounting seat for clamping therebetween the electronic device.

14. The expandable keyboard device as claimed in claim 13, wherein said mounting seat has a top face with a concavely curved shape.

15. The expandable keyboard device as claimed in claim 13, wherein said clamping mechanism further includes a connector disposed on said mounting seat for electrical connection with the electronic device.

* * * * *